Figure 1:
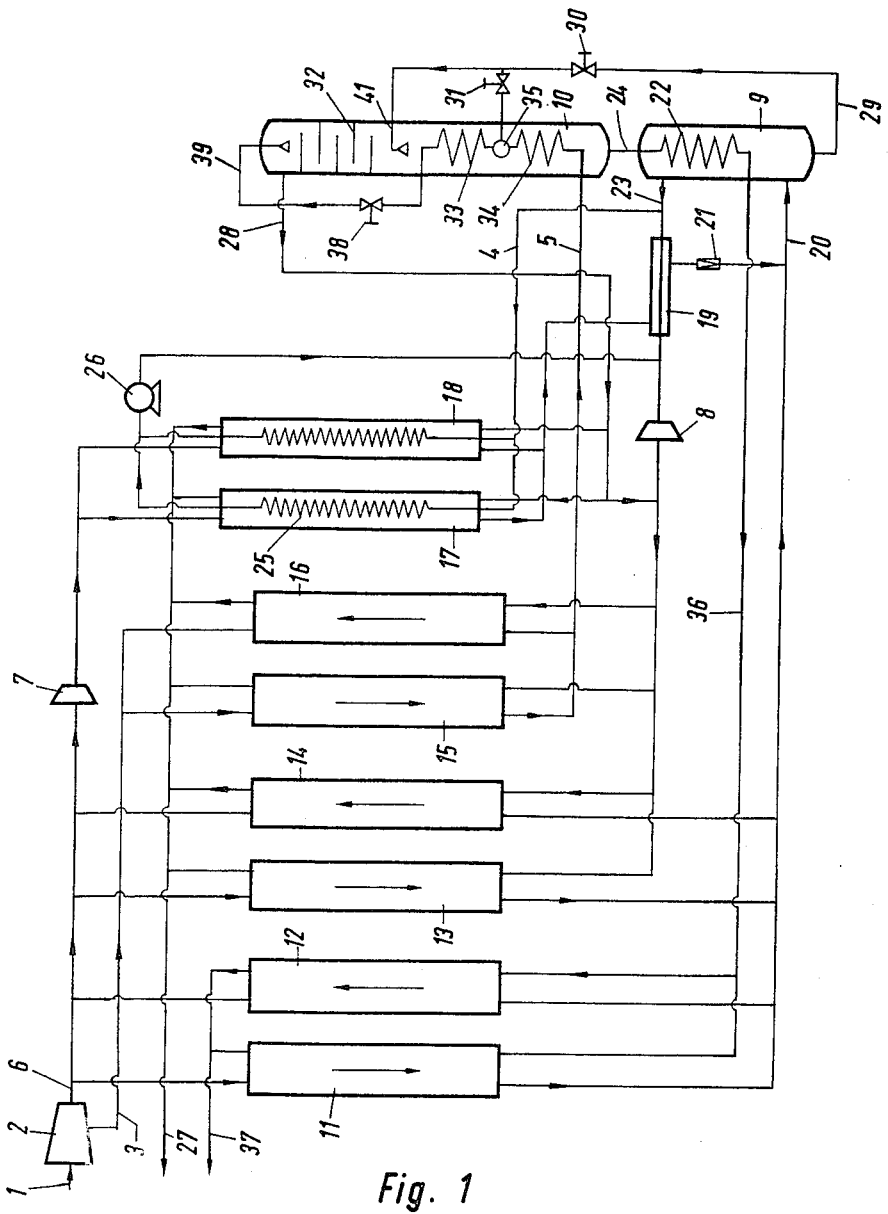

Inventor
FRITZ JAKOB

July 5, 1966  F. JAKOB  3,258,930
PROCESS AND APPARATUS FOR SEPARATING GASEOUS MIXTURES
BY LOW-TEMPERATURE RECTIFICATION
Filed Feb. 19, 1962  2 Sheets-Sheet 2
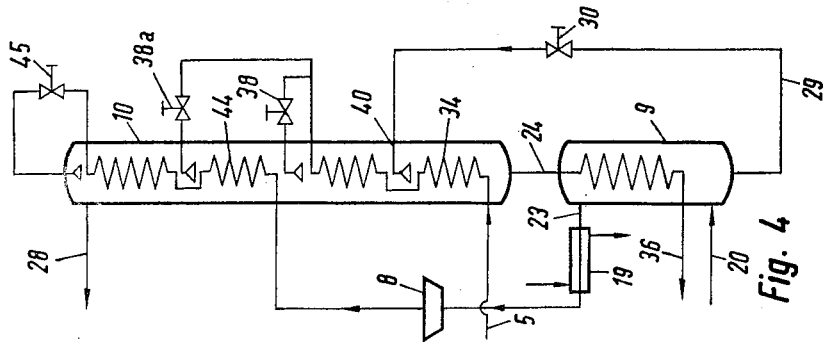
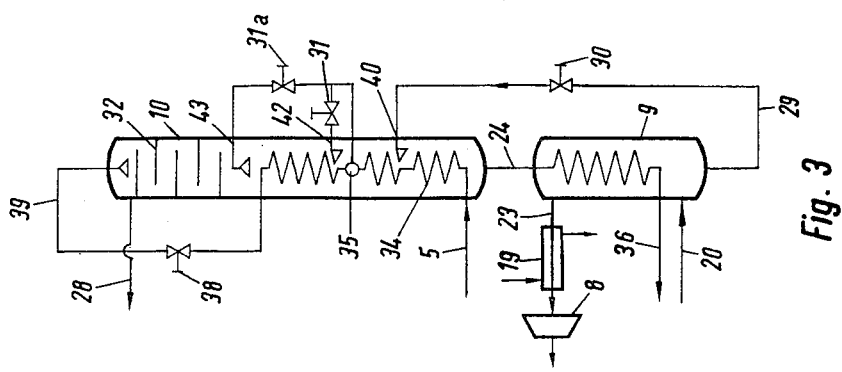
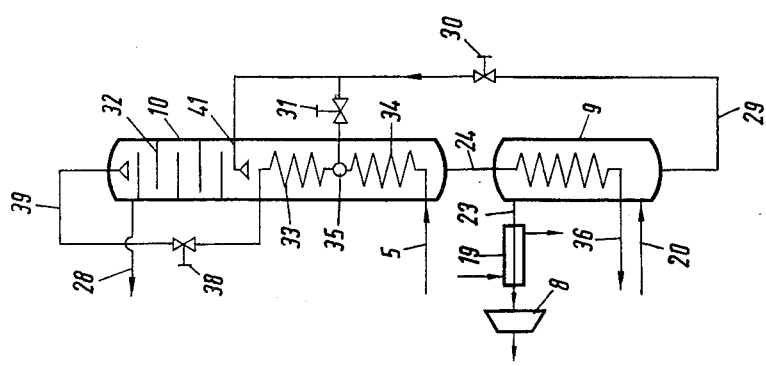
Inventor
FRITZ JAKOB
By Toulmin & Toulmin
Attorneys United States Patent Office
3,258,930
Patented July 5, 1966

3,258,930
PROCESS AND APPARATUS FOR SEPARATING GASEOUS MIXTURES BY LOW-TEMPERATURE RECTIFICATION
Fritz Jakob, Achmuhle, near Wolfratshausen, Germany, assignor to Gesellschaft für Linde's Eismaschinen Aktiengesellschaft, Wiesbaden, Germany
Filed Feb. 19, 1962, Ser. No. 173,920
Claims priority, application Germany, Feb. 23, 1961, G 31,674
7 Claims. (Cl. 62—29)

The present invention relates to the separation of gaseous mixtures by low-temperature rectification, more particularly, to a process and apparatus for producing a moderately pure separation product in a rectification installation which is connected with an evaporator.

Gaseous mixtures rich in oxygen have already been obtained by means of a fractionated condensation carried out in conjunction with rectification in a direct-flow evaporator and by a subsequent rectification in a rectification installation. The liquid rich in oxygen which accumulates in the sump of the rectification installation is evaporated in the evaporator by flowing in heat-exchange relationship with incoming air to be separated. The air to be separated is thereby condensed. The gaseous nitrogen produced as a head product is then liquefied and introduced as a washing liquid into the head of the rectification column.

This process has the advantage that the gaseous mixture to be separated can be compressed to a pressure which is lower than the pressure used in a normal two-stage rectification. However, this process has the disadvantage that the total amount of the gaseous mixture to be separated must be supplied under the same pressure at which it condenses in the evaporator while vaporizing the final product rich in oxygen.

It is therefore the principal object of the present invention to provide a novel and improved process and apparatus for separating gaseous mixtures by low-temperature rectification.

It is a further object of the present invention to provide a process and an apparatus for the separation of gaseous mixtures by low-temperature rectification wherein the initial pressure of the gaseous mixture is further reduced and, accordingly, the energy required for the separation of the gaseous mixture is decreased.

According to the present invention the gaseous mixture which is to be separated is divided into two streams which are then supplied to the separating installation at different pressures. One of these gaseous mixture streams is then separated in a direct-flow evaporator of a rectification installation. This gaseous stream is condensed by being flowed in heat exchange relationship with a refrigerant or cooling medium, which evaporates at varying temperatures, to produce nitrogen and a liquid rich in oxygen.

The other stream of the gaseous mixture is at a lower pressure and is supplied to a condenser in the rectification installation. This condenser extends at least over the lower portion of the rectification column. This condenser is preferably in a form of a spiral tube and condenses the air flowing therein by the exchange of heat with the liquid flowing down the outer walls of the condenser. This liquid is thereby rectified and increasingly enriched with oxygen from top to bottom of the column.

The liquid condensing in the condenser can be tapped therefrom at several points and can be introduced as a washing liquid into the rectification installation together with a portion of the liquid accumulating in the sump of the evaporator.

The advantage of the process as disclosed in the present invention is that the portion of the gaseous mixture supplied to the rectification installation is at a lower pressure than the pressure necessary for introducing the gaseous mixture directly to the evaporator. This is true since the gaseous mixture condenses in the rectification installation at varying temperatures. Since only a portion of the gaseous mixture must be compressed to the pressure necessary for introduction into the evaporator, it is apparent that the energy requirement for compressing the gaseous mixture is considerably lower than in the conventional two-stage rectification process.

Other objects and advantages of the present invention will be apparent upon reference to the accompanying description when taken in conjunction with the following drawings, wherein FIGURE 1 is a schematic representation of an installation for the separation of air to obtain moderately pure oxygen; and FIGURES 2 through 4 are schematic representations of various modifications of the rectification installation shown in FIGURE 1.

Particularly referring to FIGURE 1, about 3950 N m.$^3$/h. of air are supplied through the inlet line 1 to compressor 2. (N indicates that the volumetric measurements are taken at normal or standard conditions which are 0° C. and a pressure of 760 millimeters of mercury.)

Of the total quantity of air supplied to the compressor 2, 1750 N m.$^3$/h. of this air are compressed to 2.2 atmospheres absolute and then flowed through conduit 3 to a regenerator 15, wherein the air is cooled and purified. The cooled air is then flowed through conduit 5 to the lower end of the helical tube of condenser 34 positioned in the rectification column 10.

The remaining portion of the air supplied to the compressor 2 and amounting to 2200 N m.$^3$/h. is compressed to a pressure of 3.0 atmospheres absolute. This air is discharged through the discharge conduit 6 and 980 N m.$^3$/h.. of this air are cooled and purified in regenerator 11, and 995 N m.$^3$/h. cooled and purified in regenerator 13. The cooled and purified air emerging from regenerators 11 and 13 is introduced into conduit 20 which admits the air into the lower portion of the unidirectional-flow evaporator 9. The evaporator 9 is unidirectional since the liquid flowing downwardly through the heat-exchange coil 22 therein flows in the same direction as the condensed liquid resulting from the condensation of the air flowing in heat-exchange relationship to the coil 22.

The air supplied to the evaporator through the conduit 20 is condensed therein at decreasing temperatures by heat-exchange with the liquid rich in oxygen flowing downwardly through the coil 22 and evaporating therein. This air is thus separated into a liquid rich in oxygen which accumulates in the sump of the evaporator and into nitrogen which accumulates in the head of the evaporator.

If it is not possible to sufficiently heat the head product of the evaporator through an expansion performing work, it is then preferable to arrange an additional system for heating the gas to be supplied to an expansion turbine. This is accomplished by compressing a portion of the gaseous mixture to be separated a second time to a pressure higher than that necessary for operating the rectification installation. This further compressed portion of the gaseous mixture is flowed through a regenerator where it is cooled and purified and then subsequently liquefied by heat-exchange with the gaseous separation product discharged from the head of the evaporator.

To further compress this portion of the gaseous mixture, 225 N m.$^3$/h. of the air are compressed to 10 atmospheres absolute in compressor 7, then cooled and purified in the regenerator 17. The cooled and purified air is then at least partially liquefied in a heat-exchanger 19 and expanded in valve 21. The expanded air is then also introduced into the lower end of the evaporator 9 through the conduit 20.

1200 N m.³/h. of nitrogen are tapped from the head of the evaporator 9 through conduit 23. 90 N m.³/h. of this nitrogen are tapped off through the conduit 4 and flowed through a heat-exchanger coil 25 positioned in the regenerator 17. This tapped nitrogen is heated in the heat-exchanger coil and circulated by a blower 26 to the remainder of the nitrogen which has been heated in the heat-exchanger 19. The nitrogen is then subsequently expanded in expansion turbine 8 and flowed to regenerators 14 and 16 together with a portion of the nitrogen tapped through conduit 28 from the head of the rectification column 10.

1015 N m.³/h. of nitrogen are heated in regenerator 14 and 1785 N m.³/h. of nitrogen are heated in regenerator 16. Together with the nitrogen heated in regenerator 18, a total quantity of 2,950 N m.³/h. of nitrogen having an oxygen content of about 4.3% is discharged from the installation through conduit 27.

The liquid accumulating in the sump of the evaporator 9 is tapped through conduit 29, expanded in valve 30, and introduced into the rectification column 10 beneath the rectifying trays 32. The upper portion of the rectification column 10 above the condensers 33 and 34 is occupied by conventional rectifying trays.

Some of the condensate in the condensers 33 and 34 is tapped therefrom at 35 and expanded in valve 31. This expanded condensate is also introduced into the rectification column 10 at 41. This liquid rich in oxygen introduced into the rectification column through the conduit 41 is further fractionated in heat-exchange with the air condensing in the helical coils 33 and 34. As a result, a liquid still richer in oxygen accumulates in the sump of the rectification column 10 and gaseous nitrogen accumulates in the head of the column from where it is tapped through conduit 28.

The liquid rich in oxygen in the sump of the rectification column 10 is flowed through conduit 24 into the heat-exchange coil 22 in the evaporator 9. This liquid is evaporated at gradually increasing temperatures and subsequently heated in the regenerator 12 after being removed from the coil 22 through conduit 36.

About 1000 N m.³/h. of oxygen having a pure oxygen content of about 70% are discharged from the installation from regenerator 12 through the conduit 37.

The lower pressure portion of air supplied through conduit 5 is introduced into the lower end of the helical coil 34. As pointed out above, a portion of the condensing air is tapped off at 35, expanded in the valve 31, mixed with liquid exapnded in the valve 30, and then sprayed onto the helical coils 33 and 34 of the condenser positioned in the lower part of rectification column 10.

Since the main regenerators 11 through 16 are operated with a slight discharge excess, the additional pair of regenerators 17 and 18 provided for the stream of air compressed to a higher pressure must have a comparatively great entrance excess as a compensation. In order to compensate the discharge excess in the regenerators 11 through 16 and the entrance excess in the regenerators 17 and 18, a portion of the gaseous nitrogen tapped through conduit 23 from the head of the evaporator 9 is flowed through conduit 4 to a spiral coil 25 arranged in the regenerator 17. In this coil the nitrogen is heated and then returned to the stream of nitrogen emerging from the heat-exchanger 19 in front of the expansion turbine 8.

That portion of the nitrogen which is liquefied in the condenser having the coils 33 and 34 is expanded in valve 38 and introduced into the head of the rectification column through conduit 39.

FIGURE 2, which is a schematic representation of the rectification column and evaporator as shown in FIGURE 1, is a modification wherein the compression of a portion of the air to a higher pressure and the subsequent cooling of this air through heat-exchange means is eliminated. Thus, in this modification the nitrogen emerging from the evaporator 9 through conduit 23 is sufficiently heated in the heat-exchanger 19 prior to entrance into the turbine 8.

FIGURE 3 is a modification of the above-described embodiment of the invention wherein the liquid tapped at 35 from the condenser in the rectification column does not have the same composition as the liquid tapped from the sump of the evaporator through conduit 29. Accordingly, the liquid tapped through conduit 29 and expanded in the valve 30 is sprayed at 40 into the lower end of the helical coils of condenser 34. The liquid tapped at 35 is expanded by valves 31 and 31a and sprayed onto the condenser through conduits 42 and 43.

In the modification illustrated in FIGURE 4 a condenser 44 having helical tubes is positioned in the upper portion of the rectification column 10. The nitrogen which is discharged from the head of the evaporator 9 through conduit 23 is heated in the heat-exchanger 19, expanded in turbine 8 and then flowed into the lower end of the helical tube of condenser 44. This nitrogen is then condensed in the condenser, expanded in the valve 45 and introduced into the head of the rectification column 10.

That portion of the nitrogen which is liquefied in the condenser coils 34 is expanded by valves 38 and 38a with a portion of this expanded nitrogen sprayed onto condenser coil 34 and the remaining portion sprayed onto the lower end of the condenser coil 44.

Thus it can be seen that the present invention provides method for the separation of a gaseous mixture such as air wherein the energy requirement is considerably decreased.

It will be understood that this invention is susceptible to modification in order to adapt it to different usages and conditions and, accordingly, it is desired to comprehend such modifications within this invention as may fall within the scope of the appended claims.

What is claimed as this invention is:

1. In a process for separating a gaseous mixture containing higher and lower boiling components by low temperature fractionation in a fractionating column to obtain bottom product of higher boiling enriched liquid, the steps comprising:

(a) dividing said gaseous mixture into higher pressure gas mixture portion and lower pressure gas mixture portion;

(b) passing said higher pressure gas mixture portion in indirect heat transfer relationship with said bottom product in a zone external to said fractionating column, said indirect heat transfer being conducted in such manner as to evaporate said bottom product at gradually increasing temperatures, and to cool said higher pressure gas mixture portion at gradually decreasing temperatures to at least partially condense said higher pressure gas mixture portion;

(c) passing resultant condensed higher pressure gas mixture portion to said fractionating column;

(d) passing said lower pressure gaseous mixture portion to said fractionating column; and (e) passing said lower pressure gaseous mixture portion in said rectification column in indirect heat transfer relationship with said resultant condensed higher pressure gas mixture portion, said indirect heat transfer being conducted in such manner as to partially vaporize said resultant condensed higher pressure gas mixture portion at gradually increasing temperatures, and to cool said lower pressure gas mixture portion at gradually decreasing temperatures to at least partially condense said lower pressure gas mixture portion.

2. A process as defined by claim 1, further comprising withdrawing resultant condensed lower pressure gas mixture portion of step (e) in a plurality of separate streams from separate condensation zones, and recycling at least one of said separate streams to said fractionation column in indirect heat transfer relationship to said lower pressure gaseous mixture first entering said fractionation column.

3. In an apparatus for separating a gas mixture by low-temperature rectification, the combination of a rectification column having an upper portion and a lower portion with a sump therein, condenser means in the lower portion of the column and rectification trays in the upper portion thereof, an evaporator having an upper portion and a lower portion with a sump therein, a heat-exchanger coil in the evaporator with one end of said coil being connected to the sump of said rectification column, a conduit connecting the sump of said evaporator with an intermediate point of said rectification column, a source of higher pressure gas mixture to be separated connected to the lower portion of said evaporator so that said higher pressure gas mixture flows upwardly therethrough in heat-exchange relationship with said coil, compressing means connected to a main source of gas mixture to be separated for compressing portions of the gas mixture to different pressures, said compressing means being used to compress from a main source of gas mixture said higher pressure gas mixture and a lower pressure gas mixture, means connecting said compressing means to said rectification column condenser means for delivering the lower pressure portion of said gas mixture thereto, a tap connection from an intermediate point of said rectification column condenser means to said conduit between the evaporator sump and the rectification column, and a control valve in said tap connection.

4. In an apparatus for separating a gas mixture by low-temperature rectification, the combination of a rectification column having a head and an upper portion therebelow and a lower portion with a sump therein, condenser means in the lower portion of the column and rectification trays in the upper portion thereof, said condenser means having an upper outlet end and a lower inlet end, an evaporator having an upper portion and a lower portion with a sump therein, a heat-exchanger coil in the evaporator with one end of said coil being connected to the sump of said rectification column, a conduit connecting the sump of said evaporator with an intermediate point of said rectification column, a source of higher pressure gas mixture to be separated connected to the lower portion of said evaporator so that said higher pressure gas mixture flows upwardly therethrough in heat-exchange relationship with said coil, compressing means connected to a main source of gas mixture to be separated for compressing portions of the gas mixture to different pressures, said compressing means being used to compress from a main source of gas mixture said higher pressure gas mixture and a lower pressure gas mixture, means connecting said compressing means to said rectification column condenser means for delivering the lower pressure portion of said gas mixture to the lower inlet end thereof, a tap connection from an intermediate point of said rectification column condenser means to said conduit between the evaporator sump and the rectification column, a control valve in said tap connection, a second conduit connecting the upper end of said condenser means with the head of said rectification column, and a second control valve in said second conduit.

5. In an apparatus for separating a gas mixture by low-temperature rectification, the combination of a rectification column having an upper portion and a lower portion with a sump therein, first condenser means in the lower portion of the column and second condenser means in the upper portion thereof, an evaporator having an upper portion and a lower portion with a sump therein, a heat-exchanger coil in the evaporator with one end of said coil being connected to the sump of said rectification column, a conduit connecting the sump of said evaporator with an intermediate point of said rectification column, a source of higher pressure gas mixture to be separated connected to the lower portion of said evaporator so that said higher pressure gas mixture flows upwardly therethrough in heat-exchange relationship with said coil, compressing means connected to a main source of gas mixture to be separated for compressing portions of the gas mixture to different pressures, said compressing means being used to compress from a main source of gas mixture said higher pressure gas mixture and a lower pressure gas mixture, means connecting said compressing means to said rectification column condenser means for delivering the lower pressure portion of said gas mixture thereto, and heat-exchanger and expansion means connected between the upper portion of said evaporator and said second condenser means.

6. In an apparatus for separating a gas mixture by low-temperature rectification, the combination of a rectification column having an upper portion and a lower portion with a sump therein, condenser means in the lower portion of the column and rectification trays in the upper portion thereof, an evaporator having an upper portion and a lower portion with a sump therein, a heat-exchanger coil in the evaporator with one end of said coil being connected to the sump of said rectification column, a conduit connecting the sump of said evaporator with an intermediate point of said rectification column, a source of higher pressure gas mixture to be separated connected to the lower portion of said evaporator so that said higher pressure gas mixture flows upwardly therethrough in heat-exchange relationship with said coil, compressing means connected to a main source of gas mixture to be separated for compressing portions of the gas mixture to different pressures, said compressing means being used to compress from a main source of gas mixture said higher pressure gas mixture and a lower pressure gas mixture, means connecting said compressing means to said rectification column condenser means for delivering the lower pressure portion of said gas mixture thereto, a pair of regenerators having heat-exchanger coils therein with warm and cold ends, a second conduit connecting the upper portion of said evaporator with the cold ends of said regenerator heat-exchanger coils, and a blower and an expansion turbine connected with the warm ends of said coils.

7. In an apparatus for separating a gas mixture by low-temperature rectification, the combination of a rectification column having an upper portion and a lower portion with a sump therein, condenser means having an upper and lower end in the lower portion thereof and rectification trays in the upper portion of the column; an evaporator having an upper portion and a lower portion with a sump therein, a heat-exchanger coil in the evaporator with one end of said coil being connected to the sump of said rectification column, a conduit connecting the sump of said evaporator with an intermediate point of said rectification column, a main source of gas mixture to be separated, comprising means for compressing portions of said gas mixture to different low pressures, a conduit connecting said compressing means to the lower portion of the evaporator for delivering the lower pressure gas mixture thereto, means compressing portions of said gas mixture to high pressure, a conduit connecting said high pressure gas mixture to said last-named conduit by way of a heat exchanger and expander valve wherein both said gas mixtures enter the lower portion of said evaporator so that said gas mixture flows upwardly therethrough in heat-exchange relationship with said coil, means connecting said first-named compressing means to said rectification column condenser means for delivering another low pressure portion of said gas mixture thereto, a tap connection from an intermediate point of said rectification column condenser means to said conduit between the evaporator sump and the rectification column, a control valve in said tap connection, a second conduit connecting the upper end of said condenser means with the head of said rectification column, and a second control valve in said second conduit, conduits leading from the upper portion of both the evaporator and rectification column for tapping off nitrogen thtrefrom, and liquid rich in oxygen being tapped from the sump of the rectification column by said heat-exchange coil in the evaporator.

References Cited by the Examiner

UNITED STATES PATENTS

| | | | |
|---|---|---|---|
| Re. 19,267 | 8/1934 | Van Nuys | 62—29 X |
| 1,163,423 | 12/1915 | Lilienfeld | 62—34 |
| 1,664,205 | 3/1928 | Fonda | 62—31 |
| 1,968,518 | 7/1934 | Fraser | 62—29 |
| 2,040,116 | 5/1936 | Wilkinson | 62—31 |
| 2,095,809 | 10/1937 | Gomonet | 62—30 X |
| 2,134,699 | 11/1938 | Brewster | 62—31 |
| 2,360,468 | 10/1944 | Brown | 62—29 X |
| 2,502,250 | 3/1950 | Dennis | 62—31 |
| 2,709,348 | 5/1955 | Yendall | 62—14 |
| 2,713,781 | 7/1955 | Williams | 62—34 |
| 2,916,888 | 12/1959 | Cobb | 62—34 |
| 2,936,593 | 5/1960 | Grunberg | 62—26 |
| 3,057,168 | 10/1962 | Becker | 62—28 X |

FOREIGN PATENTS

| | | |
|---|---|---|
| 956,269 | 7/1949 | France. |
| 830,805 | 2/1952 | Germany. |
| 846,406 | 8/1952 | Germany. |
| 148,302 | 5/1921 | Great Britain. |
| 786,296 | 11/1957 | Great Britain. |

NORMAN YUDKOFF, *Primary Examiner.*

V. W. PRETKA, J. JOHNSON, R. C. STEINMETZ,
*Assistant Examiners.*